US 8,166,269 B2

(12) United States Patent
Vengerov (10) Patent No.: US 8,166,269 B2
(45) Date of Patent: Apr. 24, 2012

(54) ADAPTIVE TRIGGERING OF GARBAGE COLLECTION

(75) Inventor: David Vengerov, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 357 days.

(21) Appl. No.: 12/612,777

(22) Filed: Nov. 5, 2009

(65) Prior Publication Data

US 2011/0107050 A1    May 5, 2011

(51) Int. Cl.
G06F 12/02    (2006.01)
(52) U.S. Cl. .......................................... 711/170; 711/173
(58) Field of Classification Search ........................ None
See application file for complete search history.

(56) References Cited

U.S. PATENT DOCUMENTS

| | | | |
|---|---|---|---|
| 2005/0149585 A1* | 7/2005 | Bacon et al. | 707/205 |
| 2005/0149589 A1* | 7/2005 | Bacon et al. | 707/206 |
| 2006/0085433 A1* | 4/2006 | Bacon et al. | 707/100 |
| 2010/0262636 A1* | 10/2010 | Bacon et al. | 707/813 |

* cited by examiner

Primary Examiner — Than Nguyen
(74) Attorney, Agent, or Firm — Park, Vaughan, Fleming & Dowler LLP (57) ABSTRACT

Methods and apparatus are provided for adaptively triggering garbage collection. During relatively steady or decreasing rates of allocation of free memory, a threshold for triggering garbage collection is dynamically and adaptively determined on the basis of memory drops (i.e., decreases in free memory) during garbage collection. If a significant increase in the rate of allocation of memory is observed (e.g., two consecutive measurements that exceed a mean rate plus two standard deviations), the threshold is modified based on a memory drop previously observed in conjunction with the current memory allocation rate, or a memory drop estimated to be possible for the current allocation rate.

20 Claims, 5 Drawing Sheets

FIG. 1

Index:    1        2                                K

| Allocation Rate 212-1 | Allocation Rate 212-2 | . . . | Allocation Rate 212-K |

Memory Consumption Array
210

Index:        1         2         3                      N-1        N

Mem_drop:  1 x M/N   2 x M/N   3 x M/N                (N-1) x M/N   M

| Allocation Rate 232-1 | Allocation Rate 232-2 | Allocation Rate 232-3 | . . . | Allocation Rate 232-N-1 | Allocation Rate 232-N |

M = Memory Size           Memory Allocation Rate Array
                                      230

ADAPTIVE TRIGGERING OF GARBAGE COLLECTION

BACKGROUND

This invention relates to the field of garbage collection within a computing device. More particularly, apparatus and methods are provided for adaptively triggering garbage collection based on observed rates of memory allocation and/or allocations of memory during garbage collection.

There are trade-offs in any garbage collection scheme. Triggering garbage collection to recycle or free used memory too often will decrease an application's throughput, because less CPU time will be used to execute the application. Triggering it infrequently, however, may cause relatively high post times (periods of time during which the application is posted or paused while the garbage collector performs critical work) and, if invoked too infrequently could even cause the application to run out of memory.

Traditional garbage collection schemes tend to employ fixed free memory thresholds, such that the garbage collection process is initiated whenever the amount of free memory drops below a fixed threshold. One problem with using a fixed free memory threshold as a trigger for initiating garbage collection is that memory may be consumed at different rates at different times. If the fixed free memory threshold is set too high during periods of slow consumption, garbage collection may be invoked too often. If set too low during a period of relatively high consumption, the application's memory may be exhausted before garbage collection is performed.

By applying fixed thresholds, traditional garbage collectors try to avoid operating too often, and therefore generally promote application throughput over low post times. However, a real-time application may not be able to tolerate any post time or anything more than a minimal post time.

Therefore, a garbage collector that operates in conjunction with a real-time application may be required to recycle the application's memory without denying processor resources to real-time threads, and to do so frequently enough and fast enough to prevent the exhaustion of free memory and blocking of the real-time threads. Although a real-time garbage collector should be granted sufficient processor cycles to execute swiftly, allocating too many cycles should be avoided so as to avoid reducing the application's throughput unnecessarily.

Adding further complexity, however, real-time garbage collection may need to be performed concurrently—that is, in parallel with one or more application threads. This is particularly important in multi-core computing systems. Without concurrency, all application threads may have to halt during garbage collection of their memory.

SUMMARY

In some embodiments of the invention, methods and apparatus are provided for adaptively triggering garbage collection. During relatively steady or decreasing rates of allocation of free memory, a threshold for triggering garbage collection is dynamically and adaptively determined on the basis of memory drops (i.e., decreases in free memory) during garbage collection.

Memory allocation rates may be periodically measured and recorded, and used to compute an average allocation rate and a standard deviation. These values may be used to help identify a significant increase in the rate at which free memory is allocated. In addition, data may be maintained to correlate memory drops observed during garbage collection with memory allocation rates measured at the time of the garbage collection.

In some embodiments of the invention, if a significant increase in the rate of allocation of memory is observed (e.g., two consecutive measurements that exceed a mean rate plus two standard deviations), the threshold for initiating garbage collection is modified based on a memory drop previously observed in conjunction with the current memory allocation rate, or a memory drop estimated to be possible for the current allocation rate. This may cause garbage collection to be initiated immediately.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, methods and apparatus are provided for dynamically and adaptively triggering garbage collection (GC) to recycle computer memory. These embodiments are well suited for use with a Real-Time Garbage Collector (RTGC) employed in the Java Real-Time System (JavaRTS) by Sun Microsystems, Inc., but in general may be employed with any concurrent or time-based incremental garbage collector.

In these embodiments, a threshold of free memory at which a garbage collector is invoked (e.g., StartupThreshold) is dynamically and adaptively adjusted based on one or more factors. For example, while a rate of allocation of the free memory is relatively steady or decreasing, the StartupThreshold may be adjusted based on observations or calculations of the amount by which free memory drops or decreases during a garbage collection routine. Thus, if the memory drops slowly increase, StartupThreshold may be increased based on the average memory drop, the standard deviation of the memory drop and/or other factors.

If instead of remaining fairly constant, a relatively significant increase in the rate of allocation of free memory is observed, StartupThreshold may be adjusted based on memory drops during GC that have previously been observed or calculated for the observed memory allocation rate. Therefore, a historical record of memory drops, memory allocation rates and/or other data may be maintained.

Figure 1:
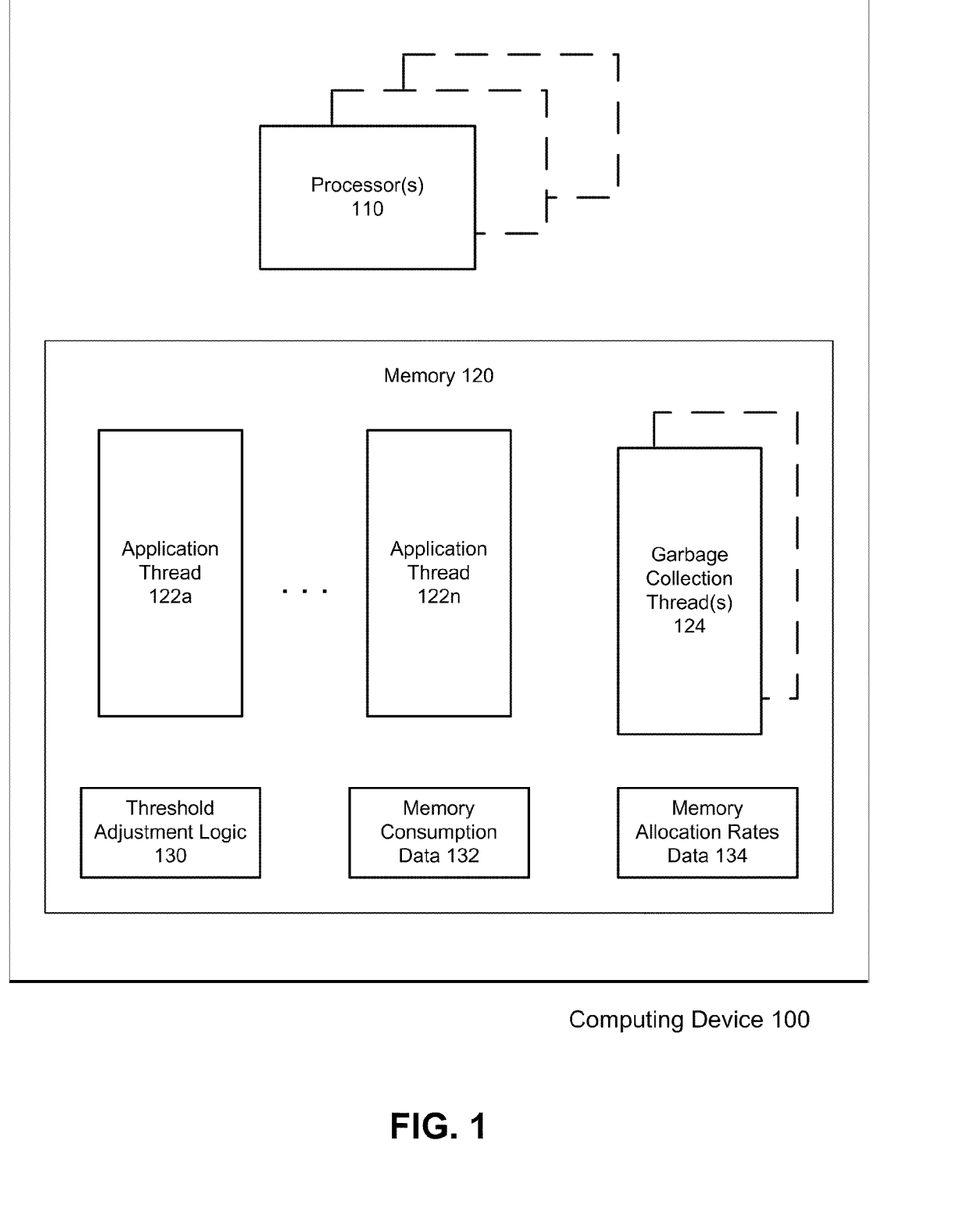
FIG. 1 is a block diagram depicting a computing environment in which real-time garbage collection may be performed in accordance with some embodiments of the present invention.

FIG. 1 is a block diagram depicting a computing environment in which real-time garbage collection may be performed in accordance with some embodiments of the present invention.

Computing device 100 includes one or more processors 110, memory 120 and other components not illustrated in FIG. 1 (e.g., display, magnetic and/or optical storage, keyboard, communication links). In some embodiments, processors 110 are multi-core processors.

Memory 120 comprises any number of application threads 122 executed by the processors, and at least one garbage collector thread 124. Illustratively, separate garbage collector threads may exist for each application executed on computing device 100, or one thread may handle multiple applications. In other embodiments of the invention, threads 122, 124 may instead comprise processes, streams modules or other sets of instructions that a processor can execute.

Memory 120 also includes threshold adjustment logic 130, memory consumption data 132 and memory allocation rates data 134. Data 132, 134 may be stored in the form of arrays, lists, databases or other structures. A variety of other data not depicted in FIG. 1 may also be stored in memory 120, as described herein. Logic 130 is executed by or in conjunction with a garbage collection thread 124 in order to adaptively adjust a free memory threshold at which the garbage collection thread is invoked (e.g., StartupThreshold).

Garbage collection threads 124 may function differently in different embodiments of the invention. For example, in some embodiments, threads 124 may execute concurrently with application threads 122. In other embodiments, threads 124 may perform time-based incremental garbage collection. Yet further, in different embodiments the garbage collection may use old and new generations of memory (i.e., memory on which garbage collection is performed), may logically subdivide memory into multiple independent regions for purposes of GC, may use tracing or reference counting to identify dead objects (objects that can be recycled), etc.

TABLE 1 lists illustrative pseudo-code for dynamically and adaptively adjusting the free memory threshold at which a garbage collection routine is invoked. The threshold adjustment routine comprises 4 parts. Part 1 initializes several data values to be used during repeated execution of the other parts. In particular, after the data values are initialized in Part 1 (or re-initialized as described below), Parts 2-4 execute each time garbage collection is performed. And, during or in association with every GC iteration, the free memory threshold for initiating GC may be changed. The routine described in TABLE 1 may be altered or implemented in various ways apparent to those of ordinary skill in the art without exceeding the scope of the invention.

TABLE 1

```
// PART 1:    Initialization
threshold1 = HeapSize/2;
StartupThreshold = threshold1;
Drop_avg = Drop_stdev = count = 0;
Sum_drop = Sum_drop_squared = 0;
```

TABLE 1-continued

```
//
// PART 2:    Measure memory drop during GC; calculate average and
//            standard deviation memory drop over "count" iterations of GC
Drop = memory_at_GC_start - min_memory_during_GC;
Sum_drop = Sum_drop + Drop;
Sum_drop_squared = Sum_drop_squared + Drop²
Drop_avg = Sum_drop/count;
Drop_stdev = ( (Sum_drop_squared/count) - Drop_avg² )^(1/2)
//
// PART 3:    Calculate candidates for new threshold
threshold1 = threshold1 × 0.5;
threshold2 = BoostedThreshold +
    ( (Drop_avg + Drop_stdev) × (1 + margin) );
//
// PART 4:    Set new threshold for starting GC
if threshold1 > threshold2
    then StartupThreshold = threshold1;
    else {
            StartupThreshold = threshold2;
            threshold1 = StartupThreshold;
    }
```

As seen in Part 1 of the pseudo-code of TABLE 1, an initial starting threshold for invoking GC may be set to half the size of free memory (e.g., the heap). In other embodiments of the invention, other initial thresholds may be implemented. Also in Part 1, variables for tracking the amount by which free memory drops or decreases during GC iterations are initialized, along with variables for calculating the standard deviation of such drops.

In Part 2 of TABLE 1, the memory drop during a current GC iteration is calculated, along with the standard deviation of memory drops over multiple iterations of GC, and running totals are maintained for total memory drops and the square of such drops over the multiple iterations. Note that in other embodiments of the invention, expected deviation, average absolute deviation or some other measure of the variability of memory drops may be used instead of standard deviation.

In Part 3, two candidate values for adjusting StartupThreshold are calculated—one based simply on the previous StartupThreshold, and one based on the observations and measurements regarding memory drops and standard deviation. In some embodiments of the invention, BoostedThreshold is a threshold of free memory such that, if the amount of free memory drops below the threshold, some or all application threads (e.g., non-critical real-time threads) may be stopped. In these embodiments, Margin is a normalized constant between 0 and 1. Finally, in Part 4, StartupThreshold is set to the larger of the two candidates, and is put into effect immediately.

Examination of the pseudo-code of TABLE 1 shows that when the rate of allocation of free memory is relatively stable, such that the memory drops during garbage collection iterations are relatively constant, StartupThreshold will converge rapidly on an efficient value. In addition, if the rate of memory allocation decreases, such that the memory drops during garbage collection become smaller, StartupThreshold will decrease accordingly to cause the GC process to be invoked less frequently.

However, if the rate of allocation of free memory increases rapidly, there may be a danger of free memory being exhausted or falling below some critical threshold before the GC process can begin reclaiming free memory. Therefore, in some embodiments of the invention, additional measures are taken to increase StartupThreshold, if warranted, when the memory allocation rate increases.

The additional measures comprise additional logic and the use of two or more data structures for tracking rates of allocation of free memory and associating such rates with memory drops that occur during garbage collection. With this data, a possible or likely memory drop can be predicted for a particular memory allocation rate, and StartupThreshold can be set accordingly to avoid running low on free memory.

Figure 2:
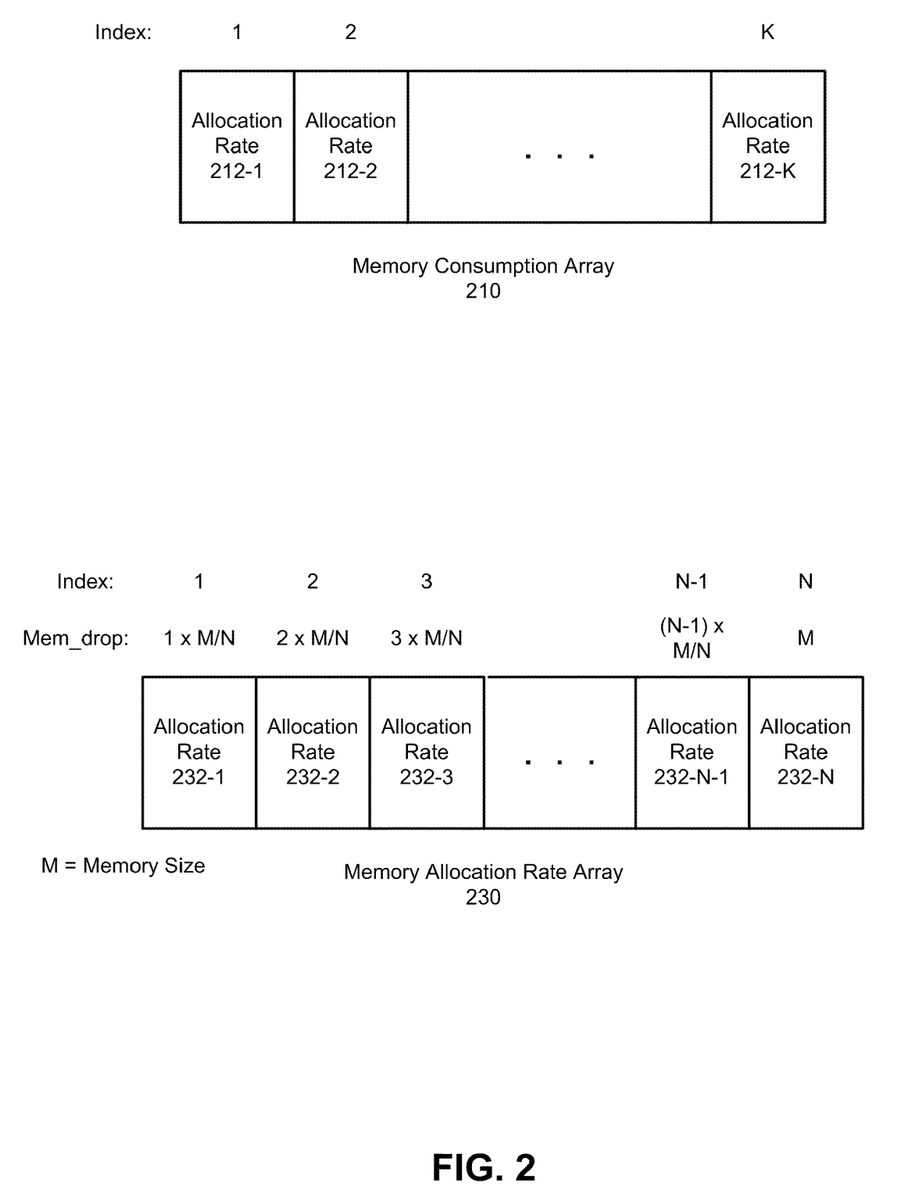
FIG. 2 is a block diagram illustrating data structures that may be implemented to assist in the adaptive adjustment of a trigger for initiating garbage collection, according to some embodiments of the invention.

FIG. 2 is a block diagram illustrating data structures that may be implemented to assist in the adaptive adjustment of a trigger for initiating garbage collection, according to some embodiments of the invention. In these embodiments, the data structures are implemented as arrays, but other types of structures may be used in other embodiments.

Memory consumption array 210 is configured with K cells for storing memory allocation rates. In some embodiments of the invention, the rate of allocation of free memory is measured periodically, (e.g., every 100 ms, every 500 ms, every second). The measurements may be stored consecutively in array 210.

More particularly, at periodic intervals the amount of free memory is observed. At each subsequent observation, the rate of allocation of the memory over the preceding interval is calculated and stored in the next cell 212 of memory consumption array 210. The memory measurements may comprise memory allotted to just one application, to multiple applications, or some other subset of all memory controlled by an operating system or computing device, depending on whether the GC thread operates for one application, multiple applications, etc.

When array 210 is filled, the first cell (i.e., cell 212-1) is overwritten, then the second, and so on, so that the array is repeatedly overwritten as necessary. In some embodiments of the invention, the periodic measurement of memory allocation rates may be tolled (paused) during garbage collection.

As will be seen below, the stored memory allocation rates may be used to compute the mean of all or a subset of the stored rates, as well as their standard deviation (or expected deviation, average absolute deviation, etc.). Of note, every time garbage collection is initiated or is to be initiated, another memory allocation rate measurement may be taken if the GC iteration does not coincide with a regular measurement. Or, instead of taking a measurement at other than a scheduled periodicity (when a GC iteration is to run), the most recent memory allocation rate may be read from array 210.

Memory allocation rate array 230 comprises N buckets corresponding to amounts by which free memory may drop during a garbage collection iteration. Thus, each bucket represents a portion of the total amount memory (M) upon which the garbage collection will operate, divided by the number (N) of buckets and multiplied by the bucket's index.

For example, if total memory (M) to be garbage collected is 2 GB, and the number of buckets (N)=100, the interval M/N equals 2 GB/100=20 MB. Bucket 1 would then correspond to a memory drop of 20 MB, bucket 2 would correspond to a memory drop of 40 MB, bucket 3 would correspond to a memory drop of 60 MB and so on, with bucket 100 corresponding to a memory drop of 2 GB.

Within each bucket is stored a memory allocation rate that has been observed or measured to have caused the corresponding memory drop, or that has been calculated or estimated as possibly being able to cause such a memory drop. Initially the buckets are empty, but as GC iterations are executed, the memory allocation rate observed or measured at the time of the GC, or just prior to the GC, is stored in the bucket corresponding to the memory drop observed during the GC iteration.

In particular, and as mentioned above, the current memory allocation rate may be obtained at the time of each iteration of garbage collection. And, as shown in TABLE 1 for an illustrative threshold adjustment procedure, the memory drop that occurs during each iteration may be calculated.

The bucket 232 corresponding to the memory drop is located in memory allocation rate array 230 (e.g., by rounding the memory drop up to the next boundary—such as from 225 MB to 240 MB). The current memory allocation rate is then stored in that current bucket, and the corresponding memory drop can be used in the future to adjust StartupThreshold if the memory allocation rate suddenly jumps to the stored rate.

If the bucket in which a memory allocation rate is to be stored is already occupied, subsequent action depends on the old (stored) rate and the new rate. If the new rate is greater than or equal to the old rate, then array 230 need not be updated because in these embodiments of the invention the array is intended to help identify possible worst case scenarios—i.e., the lowest memory allocation rate for which a particular memory drop may be incurred.

If the new rate is lower than the old rate, then the old rate may be replaced by the new rate. In some embodiments of the invention, some other value (e.g., the average of the old and new rates) may be used to overwrite the old rate.

In some embodiments of the invention, memory allocation rates in one or more other buckets may be adjusted whether or not the current bucket is altered. For example, after updating bucket B, rates stored in one or more buckets having lower indexes (B-1, B-2, possibly down to bucket 1) may be read. If those rates are lower than the new value in current bucket B, they do not need to be updated. Empty buckets may be ignored or may be filled with values less than the memory allocation rate stored in bucket B.

Illustratively, however, if the rate stored in bucket B-1 is greater than or equal to the new rate stored in bucket B, the content of bucket B-1 may be replaced with a lower rate (e.g., the average between buckets B-1 and B-2) to indicate that its corresponding memory drop may occur with a lower allocation rate than previously observed or estimated. Any number of buckets to the left of B may be examined—maybe just one or two buckets, until a bucket is found that is empty or that has a lower stored value than bucket B, etc.

Figure 3:
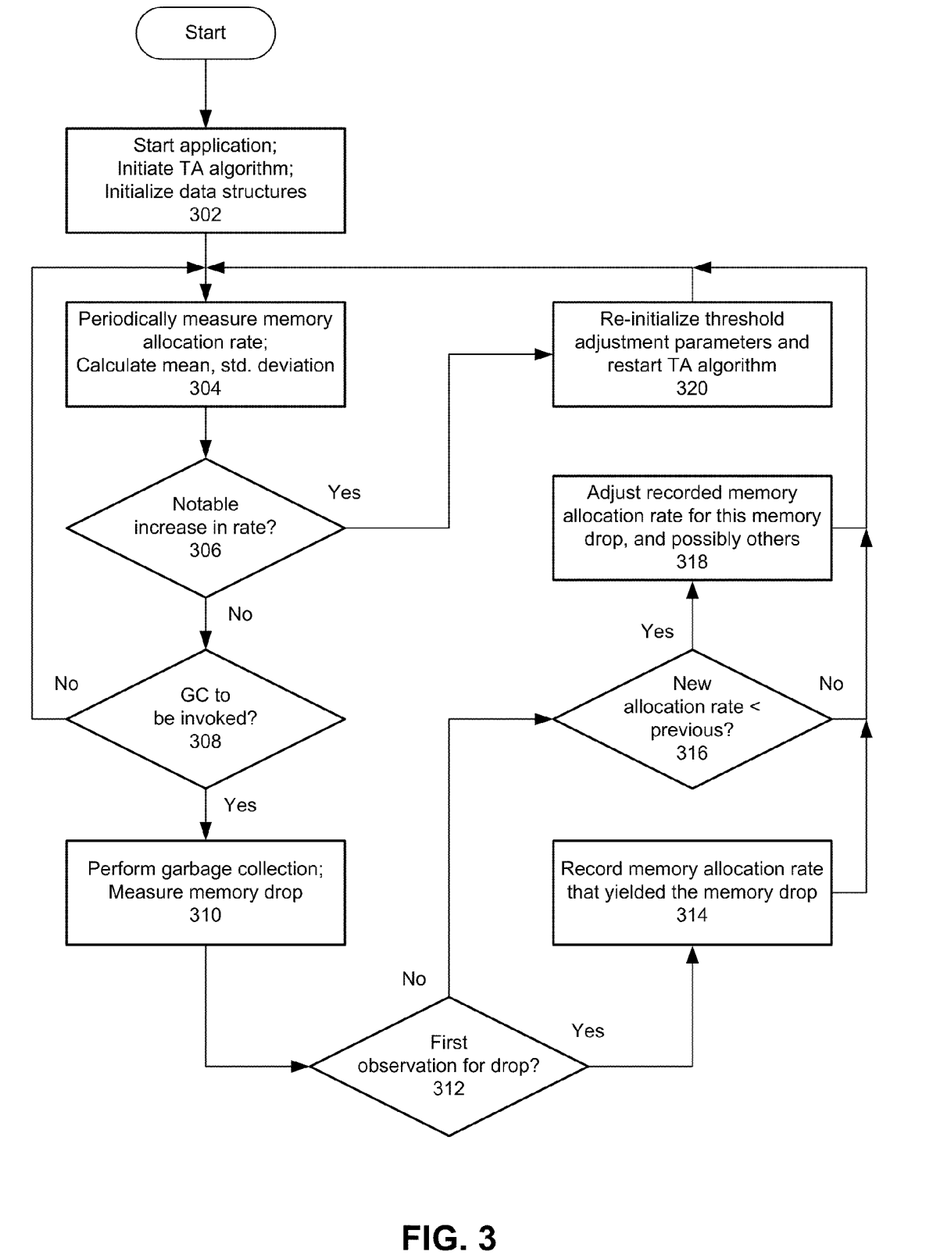
FIG. 3 is a flow chart illustrating a method of dynamically and adaptively adjusting the triggering of garbage collection according to memory allocation rates and allocations of free memory during garbage collection, in accordance with some embodiments of the invention.

FIG. 3 is a flow chart illustrating a method of dynamically and adaptively adjusting the triggering of garbage collection according to memory allocation rates and allocations of free memory during garbage collection, in accordance with some embodiments of the invention.

In these embodiments of the invention, the method illustrated in FIG. 3 operates in parallel or concurrent with an adaptive method for adjusting StartupThreshold based on memory drops during GC, such as that shown in TABLE 1. Therefore, a garbage collection thread or process is still triggered by the StartupThreshold value, but this value may be altered according to either method or both methods.

In operation 302 of FIG. 3, an application that will use memory that will be recycled by a garbage collector starts executing on a computing device. To prepare for the garbage collection process, an adaptive threshold adjustment (TA) procedure such as that shown in TABLE 1 is initiated and, in addition, one or more data structures other than those used in the TA procedure are initialized, such as structures similar to those shown in FIG. 2.

In some embodiments of the invention, and as described above in conjunction with FIG. 2, one data structure is implemented to store memory allocation rates, or data from which such rates may be calculated, such as measured levels of free memory. Another data structure is implemented to correlate memory drops (i.e., decreases in free memory) during garbage collection with memory allocation rates.

In operation 304, memory allocation rates are periodically measured and stored, such as every 100 ms, except possibly during execution of a garbage collection routine. In addition, a mean of recent memory allocation rates (e.g., the most recent 10 or 20) is calculated, along with the standard deviation of the rates or some other measure of their dispersion.

In operation 306, the method determines whether the memory allocation rate has increased notably. In some embodiments of the invention, a notable increase encompasses two or more consecutive rate measurements that exceed the mean plus two standard deviations. In other embodiments, some other data pattern may be determined to amount to a notable increase. If a notable increase in the memory allocation rate is detected, the method advances to operation 320; otherwise, it continues with operation 308.

In operation 308, the method determines whether it is time to invoke a garbage collection thread or process. As described herein, one trigger for initiating GC is a free memory threshold that falls to or below a dynamic StartupThreshold value, which may be illustratively initialized to some percentage or portion of the total free memory (e.g., one-half the heap size).

In some embodiments of the invention, the current memory allocation rate is again measured when GC is triggered, or a recent memory allocation rate may be read from memory at this time. Other observations/measurements may also be taken when GC is to commence; for example, the amount of free memory may be observed.

If GC is to be initiated, the illustrated method advances to operation 310; otherwise, the method returns to operation 304 to resume periodically measuring the rate at which free memory is allocated.

In operation 310, garbage collection is performed. The GC may be concurrent or a time-based incremental routine. The memory drop during GC is measured, which may be defined as the amount of free memory at the start of GC minus the minimum amount of free memory observed while GC is running.

In operation 312, it is determined whether a memory allocation rate has already been associated with the observed memory drop. For example, a structure such as memory allocation array 230 of FIG. 2 may be used to record memory allocation rates in association with observed memory drops.

In operation 314, no rate has been stored for this memory drop, and so the memory allocation rate determined at the commencement of the GC iteration is stored. Rates associated with one or more nearby memory drop measurements may also be adjusted, as described above. After operation 314, the method completes the GC process, if not already done, and returns to operation 304 to continue periodically monitoring the rate of allocation of free memory.

In operation 316, the present memory allocation rate is compared to a rate previously recorded for the observed memory drop. If the present rate is less than the previous rate, the method advances to operation 318. If the present rate is greater than or equal to the previously stored rate, the method completes the GC process, if not already done, and returns to operation 304 to continue periodically monitoring the rate of allocation of free memory.

In operation 318, the memory allocation rate previously stored for the observed memory drop is replaced or updated based on the present memory allocation rate. For example, the present rate may replace the previous rate or be averaged with it. As described above, memory allocation rates associated with one or more nearby memory drops may also be updated or replaced. After operation 318, the method completes the GC process, if not already done, and returns to operation 304 to continue periodically monitoring the rate of allocation of free memory.

In operation 320, the memory allocation rate has increased, and so it is appropriate to modify the StartupThreshold for triggering garbage collection. In some embodiments of the invention, a data structure such as array 230 of FIG. 2, is examined to find an entry or bucket relating to the same or a similar memory allocation rate (e.g., the next highest rate), and the corresponding memory drop is read as Drop_new. If multiple buckets in the structure store the same memory allocation rate, the highest corresponding memory drop may be adopted as Drop_new.

In some embodiments of the invention, the GC trigger StartupThreshold is set to the sum of BoostedThreshold (a memory threshold below which some threads may be stopped) and Drop_new. If free memory is already below the new StartupThreshold, GC should be triggered immediately. In terms of the TA process of TABLE 1, threshold) is also set to BoostedThreshold+Drop_new, to prepare for the next GC iteration.

After operation 320, the method completes the GC iteration and returns to operation 304 to continue monitoring the rate of allocation of free memory.

Figure 4:
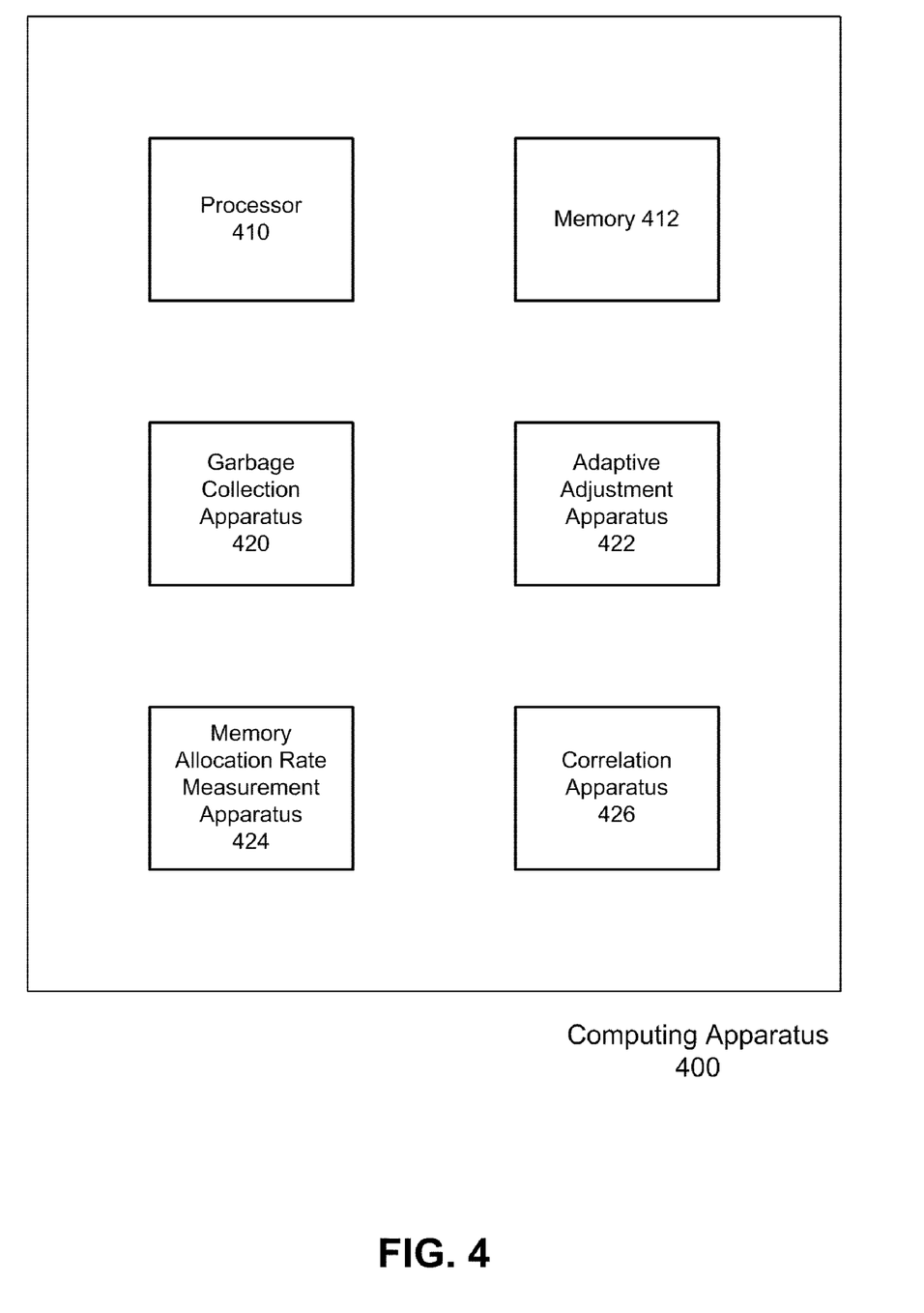
FIG. 4 is a block diagram of apparatus for adaptively adjusting the triggering of garbage collection, according to some embodiments of the invention.

FIG. 4 is a block diagram of apparatus for adaptively adjusting the triggering of garbage collection, according to some embodiments of the invention.

Computing apparatus 400 of FIG. 4 comprises processor 410 for executing computer-executable instructions, and memory 412 for storing the instructions and data.

Garbage collection apparatus 420 is adapted to recycle memory 412 used by applications and/or other programs executing on the computing apparatus. Adaptive adjustment apparatus 422 is adapted to dynamically adjustment a free memory threshold for trigger apparatus 420, according to observations of the amount by which the free memory drops or decreases during iterations of garbage collection. Apparatus 422 may store results of its measurements and/or calculations within memory 412 or some other data storage apparatus.

Memory allocation rate measurement apparatus 424 is adapted to periodically measure the amount of free memory within memory 412, and to calculate a rate at which the free memory is being allocated. Apparatus 424 may store results of its measurements and/or calculations within memory 412 or some other data storage apparatus.

Correlation apparatus 426 is adapted to correlate memory drops observed during operation of garbage collection apparatus 420 with memory allocation rates determined by memory allocation rate measurement apparatus 424. Apparatus 426 may store results of its measurements and/or calculations within memory 412 or some other data storage apparatus.

Figure 5:
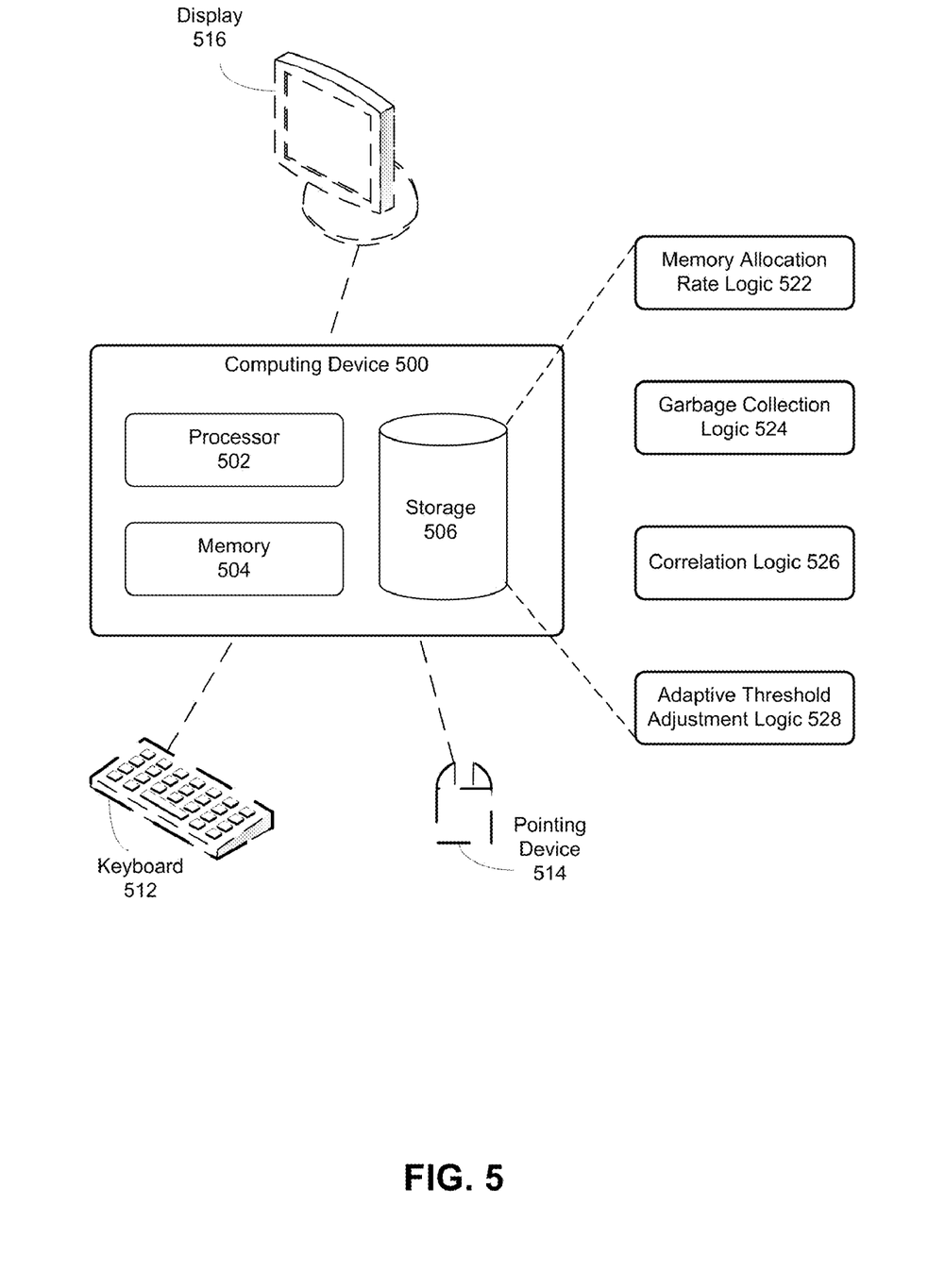
FIG. 5 is a block diagram of a computer system in which free memory thresholds for initiating garbage collection may be adaptively adjusted, according to some embodiments of the invention.

FIG. 5 is a block diagram of a computer system in which free memory thresholds for initiating garbage collection may be adaptively adjusted, according to some embodiments of the invention.

Computing device 500 of FIG. 5 comprises processor 502, memory 504 and storage 506, which may comprise one or more optical and/or magnetic storage components. Computing device 500 may be coupled (permanently or transiently) to keyboard 512, pointing device 514 and display 516.

Storage 506 stores logic that may be loaded into memory 504 for execution by processor 502. Such logic includes memory allocation rate logic 522, garbage collection logic 524, correlation logic 526 and adaptive threshold adjustment logic 528.

Memory allocation rate logic 522 comprises processor-executable instructions for measuring, observing, calculating, reading, storing and/or otherwise processing rates of allocation of free memory within computing device 500. Logic 522 may operate on all of memory 504 or just a subset thereof, such as memory allotted to a particular application.

Garbage collection logic 524 comprises processor-executable instructions for recycling free memory within computing device 500, and may operate on all of memory 504 or just a subset thereof, such as memory allotted to a particular application.

Correlation logic 526 comprises processor-executable instructions for correlating drops or decreases in free memory observed during operation of garbage collection logic 524 with memory allocation rates determined by memory allocation rate logic 522.

Adaptive adjustment logic 528 comprises processor-executable instructions for adaptively adjusting a free memory threshold used to trigger garbage collection logic 524. Such adjustments may depend on memory allocation rates determined by logic 522 and/or memory drops measured during operation of logic 524.

The environment in which a present embodiment of the invention is executed may incorporate a general-purpose computer or a special-purpose device such as a hand-held computer. Details of such devices (e.g., processor, memory, data storage, display) may be omitted for the sake of clarity.

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), and other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of adaptively triggering garbage collection within a computer system, the method comprising:

initializing a data structure to comprise N empty buckets (N>0), wherein each bucket represents an amount of free memory;

periodically recording a rate of allocation of free memory;

for each of multiple iterations of garbage collection:
calculating a mean rate of allocation of free memory prior to the iteration;
observing a drop in the free memory during the iteration;
reading the data structure to examine a bucket corresponding to the observed memory drop;
if the bucket is empty, storing in the bucket the calculated mean rate of allocation of free memory; and
if the bucket stores a rate of allocation higher than the calculated mean rate of allocation of free memory, replacing the stored rate of allocation with a new rate of allocation; and if an increase in the rate of allocation of free memory is observed during said periodic recording, adjusting a free memory threshold at which the garbage collection is initiated.

2. The method of claim 1, wherein each bucket B=1 to N in the data structure represents a portion of the free memory M calculated as $B \times (M \div N)$.

3. The method of claim 1, wherein said periodically recording comprises:
periodically measuring an amount of free memory available for allocation; and
from the measurements of available free memory, calculating the rate of allocation of free memory.

4. The method of claim 3, wherein said calculating a mean rate of allocation of free memory prior to the iteration comprises:
calculating an average of multiple calculated rates of allocation of free memory.

5. The method of claim 1, wherein said drop in free memory during an iteration of garbage comprises an amount of free memory available for allocation prior to the iteration minus a lowest amount of free memory available for allocation during the iteration.

6. The method of claim 1, wherein said reading the data structure to examine a bucket corresponding to the observed memory drop comprises:
identifying a bucket corresponding to the amount of the observed memory drop; and
reading an entry in the bucket.

7. The method of claim 1, further comprising if the bucket stores a rate of allocation higher than the calculated mean rate of allocation of free memory:
reading an adjacent bucket corresponding to a next lower amount of free memory, if such a bucket exists; and
if the adjacent bucket stores a rate of allocation that is not lower than the calculated mean rate of allocation, decreasing the rate of allocation stored in the adjacent bucket.

8. The method of claim 7, wherein said decreasing the rate of allocation comprises:
calculating an average of the rate of allocation stored in the adjacent bucket and a rate of allocation stored in the next adjacent bucket; and
storing said average in the adjacent bucket.

9. The method of claim 1, wherein the new rate of allocation stored in the bucket is the calculated mean rate of allocation of free memory.

10. The method of claim 1, wherein the new rate of allocation stored in the bucket is an average of the stored rate of allocation and the calculated mean rate of allocation of free memory.

11. A computer-readable medium storing instructions that, when executed by a computer, cause the computer to perform a method of adaptively triggering garbage collection within the computer, the method comprising:
  initializing a data structure to comprise N empty buckets (N>0), wherein each bucket represents an amount of free memory;
  periodically recording a rate of allocation of free memory;
  for each of multiple iterations of garbage collection:
    calculating a mean rate of allocation of free memory prior to the iteration;
    observing a drop in the free memory during the iteration;
    reading the data structure to examine a bucket corresponding to the observed memory drop;
    if the bucket is empty, storing in the bucket the calculated mean rate of allocation of free memory; and
    if the bucket stores a rate of allocation higher than the calculated mean rate of allocation of free memory, replacing the stored rate of allocation with a new rate of allocation; and
  if an increase in the rate of allocation of free memory is observed during said periodic recording, adjusting a free memory threshold at which the garbage collection is initiated.

12. A computer-implemented method of adaptively triggering garbage collection within the computer, the method comprising:
  setting a starting free memory threshold at which the garbage collection is to be initiated;
  for each of multiple garbage collection iterations initiated when an amount of free memory falls to the starting free memory threshold:
    calculating an average drop in free memory over the completed iterations;
    calculating a standard deviation of the drops in free memory over the completed iterations;
    calculating a first candidate threshold as a portion of the starting free memory threshold;
    calculating a second candidate threshold from the average drop in free memory and the standard deviation; and
    resetting the starting free memory to the larger of the first candidate threshold and the second candidate threshold.

13. The method of claim 12, wherein the drop in free memory during a given iteration of the garbage collection equals an amount of free memory of the application at the start of the iteration minus a lowest amount of free memory during the iteration.

14. The method of claim 12, wherein the first candidate threshold is a fraction of the starting free memory threshold.

15. The method of claim 12, wherein the second candidate threshold comprises a critical free memory threshold plus a function of the average drop in free memory and the standard deviation.

16. The method of claim 15, wherein said critical memory threshold is a memory threshold at which one or more non-critical processor threads are blocked.

17. The method of claim 12, wherein the second candidate threshold is calculated as a critical free memory threshold plus a sum of the average drop in free memory and the standard deviation, multiplied by a margin factor.

18. The method of claim 12, wherein the garbage collection comprises concurrent, real-time garbage collection.

19. The method of claim 12, further comprising:
  periodically recording a memory allocation rate indicating a rate at which the free memory is being allocated; and
  configuring a data structure to associate memory drops during the garbage collection iterations with average memory allocation rates observed before the iterations.

20. The method of claim 19, further comprising:
  for each of the multiple iterations of garbage collection:
    calculating a mean rate of allocation of free memory prior to the iteration;
    observing a drop in the free memory during the iteration;
    reading the data structure to examine an entry corresponding to the observed memory drop;
    if the bucket is empty, storing in the bucket the calculated mean rate of allocation of free memory; and
    if the bucket stores a rate of allocation higher than the calculated mean rate of allocation of free memory, replacing the stored rate of allocation with a lower of allocation; and
  if an increase in the rate of allocation of free memory is observed during said periodic recording, adjusting the starting free memory threshold.

* * * * *